(12) United States Patent
Dellow

(10) Patent No.: US 8,612,774 B2
(45) Date of Patent: Dec. 17, 2013

(54) SECURE OTP USING EXTERNAL MEMORY

(75) Inventor: Andrew Dellow, Gloucestershire (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 2627 days.

(21) Appl. No.: 11/236,306

(22) Filed: Sep. 27, 2005

(65) Prior Publication Data

US 2006/0092049 A1 May 4, 2006

(30) Foreign Application Priority Data

Sep. 27, 2004 (EP) ..................................... 04255894

(51) Int. Cl.
*G06F 21/00* (2013.01)

(52) U.S. Cl.
USPC ............ 713/193; 713/153; 380/258; 380/264

(58) Field of Classification Search
USPC .............. 726/26; 713/153, 193; 380/258, 264; 370/536; 455/158
See application file for complete search history.

(56) References Cited

U.S. PATENT DOCUMENTS

| | | | | |
|---|---|---|---|---|
| 5,239,700 A | * | 8/1993 | Guenther et al. | 455/158.4 |
| 5,363,334 A | | 11/1994 | Alexander et al. | 365/218 |
| 5,469,557 A | | 11/1995 | Salt et al. | 395/425 |
| 5,805,706 A | * | 9/1998 | Davis | 713/153 |
| 6,707,696 B1 | | 3/2004 | Turner et al. | 365/96 |
| 6,728,271 B1 | * | 4/2004 | Kawamura et al. | 370/536 |
| 7,340,614 B2 | * | 3/2008 | Fujiwara et al. | 713/193 |
| 2002/0073316 A1 | | 6/2002 | Collins et al. | 713/174 |

FOREIGN PATENT DOCUMENTS

EP 1 043 860 A2 10/2000

* cited by examiner

*Primary Examiner* — Jeffrey Pwu
*Assistant Examiner* — Helai Salehi
(74) *Attorney, Agent, or Firm* — Seed IP Law Group PLLC

(57) ABSTRACT

A set-top-box has on-chip OTP memory emulated using an external flash memory and a series of on-chip fuses. The external memory is comprised of one or more regions, each having its own unique region identification. Each on-chip fuse corresponds to one of the memory regions and comprises a component which can be caused to change to a particular (blown) state irreversibly. When data first needs to be written to a region of the external memory, the identification of that region is appended to the data itself together with a parity field and a validity field. The resultant data packet is then encrypted by a cryptographic circuit using a secret key unique to the set-top-box and the encrypted data packet is written to the specified region of the external memory. Then, the on-chip fuse corresponding to the region that has been written to is irreversibly blown, effectively locking that region.

48 Claims, 1 Drawing Sheet

SECURE OTP USING EXTERNAL MEMORY

BACKGROUND OF THE INVENTION

1. Field of the Invention

This invention relates to devices which use on-chip one-time-programmable memory, including, but not limited to, secure devices in the field of pay-television.

2. Description of the Related Art

Many systems use on-chip one-time-programmable (OTP) memory which is memory that can be written to once only. For example, in the field of pay-television, a set-top-box may use on-chip OTP in scrambling circuits for storing encryption keys for system message delivery and authentication. In view of the nature of many applications, including the example above, it is important that the contents of the memory remains secret. Placing the memory on the chip itself increases the security of the memory and prevents unauthorised access to the sensitive data.

One problem with on-chip OTP is that it is expensive in both manufacturing costs and chip area. For example, a 256 byte memory may require a chip area of 1 mm$^2$, which may be as much as 5% of the total chip area. It may be desirable to provide larger memories but the increase in chip size and manufacturing costs may become prohibitive.

One solution to this problem is to emulate on-chip memory using external flash memory where data is stored in the external flash in an encrypted form to maintain security. This solution has the disadvantage of being vulnerable to 'replay attacks' where old data stored in the external flash memory is replaced. Cloning may also be possible where the external flash memory is physically removed and replaced by a new memory. These disadvantages each increase the likelihood of a hacker being able to breach the overall security of the system.

We have appreciated the difficulties mentioned above. The present invention overcomes these disadvantages and provides for secure emulated on-chip OTP memory.

BRIEF SUMMARY OF THE INVENTION

The invention is defined in the independent claims to which reference may now be made. Preferred features of the invention are set out in the dependant claims.

An embodiment of the invention comprises a set-top-box in which on-chip OTP memory is emulated using an external flash memory and a series of on-chip fuses. The external memory is comprised of one or more region, each having its own unique region identification. Each on-chip fuse corresponds to one of the memory regions and comprises a component which can be caused to change to a particular (blown) state irreversibly. When data first needs to be written to a region of the external memory, the identification of that region is appended to the data itself together with a parity field and a validity field. The resultant data packet is then encrypted by a cryptographic circuit using a secret key unique to the set-top-box and the encrypted data packet is written to the specified region of the external memory. Then, the on-chip fuse corresponding to the region that has been written to is irreversibly blown, effectively locking that region. Any attempt to write data to regions for which the corresponding fuse has already been blown (indicating that data has already been written to that region) are blocked.

When data is read from the external memory, the encrypted data is decrypted to retrieve the data, region identification, validity field and parity field. If the region identification, validity field and parity field are all verified as valid then the data is transmitted to the desired destination. Any attempts to read data from regions for which the corresponding fuse has not been blown (indicating that no data has yet been written to that region) are blocked.

DETAILED DESCRIPTION OF THE INVENTION

The present invention may be employed in any system in which memory contained on a chip may be used. In particular, the present invention may be advantageously employed in any system where relatively large amounts of secure on-chip memory may be required. In an exemplary embodiment, the present invention finds application in a scrambling circuit within a set-top-box in a pay-television system. In such an application, on-chip memory may be used to store box pairing keys of the order of 256 bytes each. A set-top box comprises audio and video descramblers, input and output ports, processors and memory for producing audio and video TV signals from a scrambled broadcast data stream and is well known to those skilled in the art and not described further.

Figure 1:
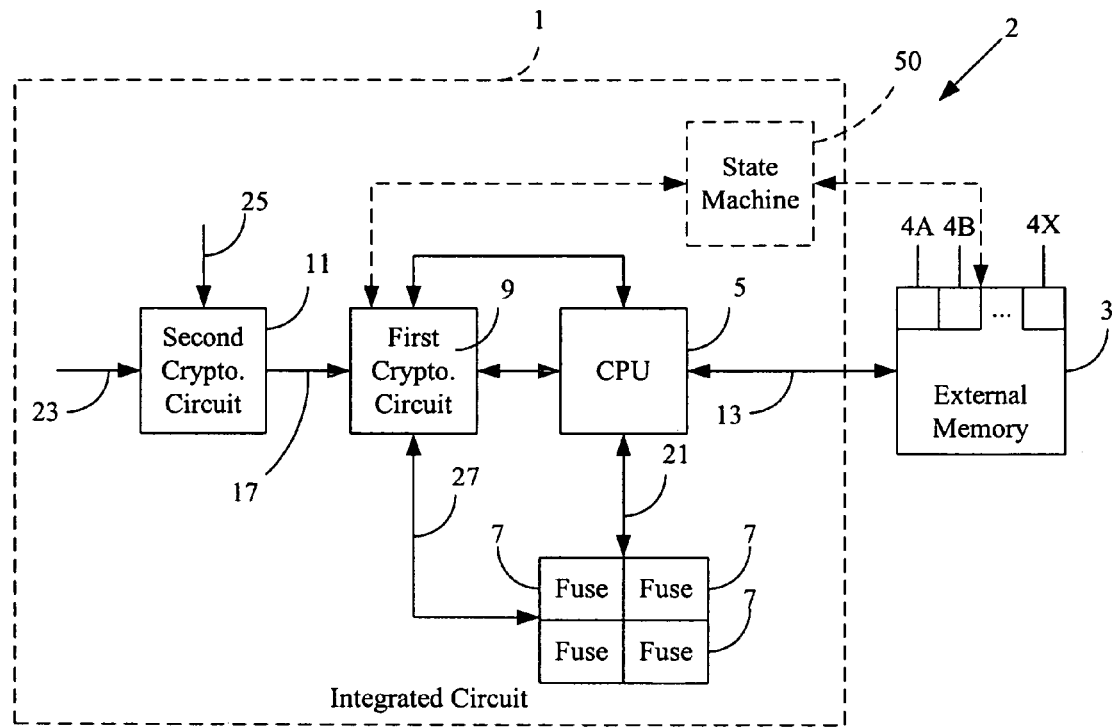
FIG. 1 is a schematic diagram of a system embodying the invention.

A portion of a scrambling circuit embodying the invention within a set-top-box 2 is shown in FIG. 1. The scrambling circuit comprises a semiconductor integrated circuit 1 and an external memory 3. The external memory 3 is a non-volatile memory such as a flash memory or any other suitable memory. The circuit 1 comprises a controlling CPU 5, a series of fuses 7, a first cryptographic circuit 9 and a second cryptographic circuit 11.

The CPU 5 is provided for controlling various aspects of the set-top-box function. For example, in this embodiment, the CPU 5 is arranged to control the cryptographic functions of the set-top-box such as decrypting encrypted broadcast data. In order to perform these functions, the CPU 5 employs a certain amount of memory to store various data used by the CPU 5. For example, the CPU 5 may need to store decryption keys used to decrypt the broadcast data. In prior devices, such a memory would have been provided on the circuit 1. However, according to the embodiment of the present invention shown in FIG. 1, this memory is provided instead by the external memory 3. Using external memory is significantly cheaper than using on-chip memory and large amounts of memory may be provided without significantly increasing the size of the circuit 1.

The CPU 5 communicates with the external memory 3 via a data pathway 13, for example a BUS connection. The CPU 5 is connected to the first cryptographic circuit 9 via two data pathways 15, 19 and is connected to the fuses 7 by another pathway 21. The first cryptographic circuit 9 is connected to the second cryptographic circuit via a data pathway 17 and is connected to the fuses 7 by another pathway 27. The second cryptographic circuit 11 also receives input via two data pathways 23, 25.

Since external memory may be more vulnerable to hacking than on-chip memory, data is stored in the external memory 3 in an encrypted form. It is important that the keys used to encrypt and decrypt the data remain secret. Encrypting the data prevents unauthorized access to the data since a hacker would not know the correct decryption key and would therefore be unable to decrypt the data. Storing data in an encrypted form also prevents hackers from writing unauthorized data to the external memory 3 since a hacker would not know the correct encryption key and would therefore be unable to correctly encrypt the data. If unauthorized data were to be written to the external memory 3 in an unencrypted or wrongly encrypted form, when the data came to be subsequently retrieved and undergo the decryption process using the correct key, then incomprehensible data would result.

Figure 2:
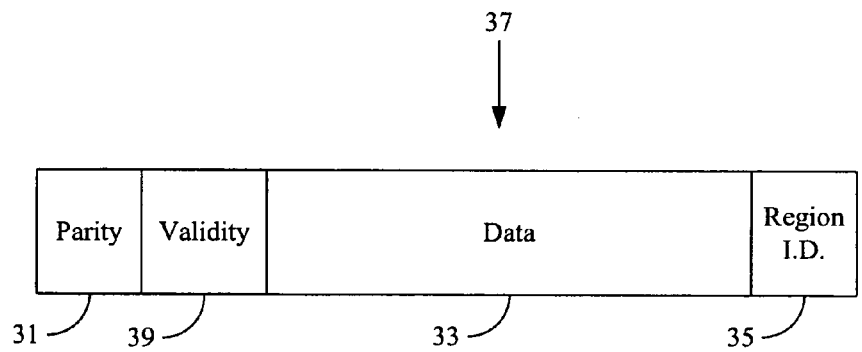
FIG. 2 is a schematic diagram of a data packet used in the system shown in FIG. 1.

The external memory 3 is comprised of one or more regions 4A, 4B, . . . , 4X, each region being identifiable by a unique region identification, for example in the form of a binary field. In one embodiment having a plurality of regions, not all of the regions are the same size, and in another embodiment no two regions are the same size. When it is desired to write a portion of data to the external memory 3, the following process is carried out. The CPU 5 appends to a region identification field 35 of a data packet 37 an identification of the region to which the data will be written (FIG. 2). The data packet also includes a data portion 33 together with a parity field 31 and a validity field 39.

In one embodiment, the parity field 31 comprises a single bit which is equal to 0 if the total number of bits in the data portion and region identification having the value of 1 is odd, and equal to 1 otherwise. In other embodiments however multiple bits may be provided in the parity field. The parity field 31 is used to check the correctness of the data using known techniques.

The validity field comprises a fixed binary field of a particular size, for example 32 bits and is used to provide a further check on the correctness of the data as explained in greater detail below. The resultant data packet 37 is shown in FIG. 2.

The CPU 5 then transmits the data packet 37 to the first cryptographic circuit 9 via the data pathway 15. The first cryptographic circuit 9 is arranged to encrypt the data packet 37 according to a particular algorithm using an encryption key received via the data pathway 17. In one embodiment for example, the data packet 37 may be encrypted according to the AES algorithm using a 256 bit key. The encrypted data packet is then transmitted from the first cryptographic circuit 9 back to the CPU 5 via the data pathway 19. The CPU 5 then transmits the encrypted data packet via the bus 13 to the external memory 3 where it is stored in the appropriate region.

In order to prevent hackers from circumventing security, for example by feeding unauthorized data into the first cryptographic circuit 9 which is then correctly encrypted and transmitted by the CPU 5 to the external memory 3, the following scheme is employed. Each one of the series of fuses 7 corresponds to a particular region of the external memory 3. Each fuse comprises a component which initially lies in a first state, but which may be caused to irreversibly change to a second state. Any component which provides this function may be considered to be a fuse. As an example, a fuse may comprise an AND gate where both inputs are high, and where one of the inputs can be permanently blocked by the addition of an oxide layer thus permanently changing the output of the AND gate from high to low. In another example, a fuse may comprise a single bit of a secure on-chip write-once memory. A fuse that has been permanently set to a particular state may be referred to as a blown fuse.

When data is passed to the first cryptographic circuit 9 from the CPU 5 to be encrypted, the first cryptographic circuit 9 determines whether the fuse corresponding to the region the data will be written to has been blown. The first cryptographic circuit 9 accesses information relating to the state of the series of fuses 7 via the data pathway 27. If the fuse has not been blown, the first cryptographic circuit 9 encrypts the data which is then passed to the CPU 5 which in turn writes the data to the appropriate region of the external memory. The CPU 5 then transmits a signal via the data pathway 21 to the series of fuses 7 which causes the fuse corresponding to the memory region written to be blown. In some embodiments, the cryptographic circuit 9 is responsible for blowing the appropriate fuses. In yet further embodiments, the CPU 5 is responsible for determining whether a fuse has been blown. If, before attempting to encrypt the data, the first cryptographic circuit 9 determines that the fuse corresponding to the region to be written to has already been blown, the first cryptographic circuit 9 does not encrypt the data and returns an error signal to the CPU 5 so that the data write is blocked.

It can be seen that the series of fuses 7 provide an indication of which regions of the external memory 3 have already been written to. Since data writes to regions already written to are blocked, blowing a fuse corresponding to a particular region effectively locks that region to further data writes. Thus, if a hacker attempts to cause the system itself to re-write unauthorized data to the external memory 3, the data write will be blocked.

In order to prevent cloning of the set-top-box where a hacker attempts to physically remove the external memory 3 from one set-top-box and replace it with a different memory, the encryption key used to encrypt the data stored in the external memory 3 is unique to each set-top-box. Such a key may be referred to as an OTP key. In one embodiment, the OTP key is derived from a further secret key that is unique to each set-top-box. In particular, an OTP key may be derived by encrypting a fixed value using the secret key. Having the OTP key derived from a further key provides the advantage that if data in the external memory 3 is hacked by a brute force attack to identify the OTP key, the identity of the secret key, which may be used in other parts of the system, is not revealed. A hacker would then need to perform a separate brute force attack to identify the secret key. In one embodiment, the fixed value is a randomly generated key that is stored in the external memory 3. The random nature of the key provides the advantage of increased security. The random key is generated by any suitable random generating means, for example at the manufacturing stage or by the circuit 1 before the first use. The random key may remain fixed in value once stored in the external memory 3 throughout the life of the circuit 1.

The second cryptographic circuit 11 receives the secret key via the data pathway 23 and encrypts the secret key using the random key received via the data pathway 25. The secret key may be encrypted using any suitable algorithm such as the AES algorithm. The OTP key, being the encrypted secret key, is transmitted from the second cryptographic circuit 11 to the first cryptographic circuit 9 via data pathway 17. The first cryptographic circuit 9 then uses the OTP key to encrypt data packets as described above.

Data stored in the external memory 3 is thus encrypted using a key that is unique to the set-top-box. If the external memory 3 were to be replaced by an external memory 3 from a different set-top-box, then the data stored in the replacement memory would be encrypted using a different key to that used in the original set-top-box. When the data in the replacement memory came to be decrypted it would therefore be decrypted using the wrong key and the resultant data would be incomprehensible. In particular, the region identification check, validity field check and parity check would fail.

When data is to be read from the external memory 3, the CPU 5 transmits signals to the external memory 3 requesting data access from a specified region. The requested data, which is in an encrypted form, is transmitted from the external memory 3 to the CPU 5 via data pathway 13. To decrypt the data, the CPU 5 transmits the encrypted data to the first cryptographic circuit 9 via data pathway 19. Before attempting to decrypt the data, the first cryptographic circuit 9 checks whether the region from which data is to be read has been written to by determining the state of the fuse corresponding to that region. If the first cryptographic circuit 9 determines that the fuse has not been blown, indicating that data has not yet been written to that region, the first cryptographic circuit 9 does not decrypt the data and returns an error signal to the CPU 5. If the first cryptographic circuit 9 determines that the fuse has been blown, indicating that data has been written to that region, then the first cryptographic circuit 9 decrypts the data. The first cryptographic circuit 9 decrypts the data using the OTP key received via data pathway 17 and the decrypted data is transmitted back to the CPU 5 via data pathway 15. The decrypted data 37 comprises the data itself 33, the region identification 35, validity field 39 and the parity field 31. Having the cryptographic circuit 9 rather than the CPU 5 perform the checks of the state of the fuses 7 has the advantage that illegal software running on the CPU is prevented from bypassing the fuse check thereby allowing illegal data reads and writes from and to the external memory 3.

The CPU 5 checks the correctness of the region identification by comparing the region identification 35 obtained from the data packet 37 with the identification of the region that the data was requested from by the CPU. The CPU 5 also checks the correctness of the data by performing a parity check using the parity field 31. A further check of the decrypted data is performed by checking the correctness of the validity field. The region identification may be a relatively small field so that there is a significant chance that even an incorrectly decrypted data packet would contain the correct region identification. Similarly with the parity field, there is a significant chance that an incorrectly decrypted data packet could pass the parity check, especially if the parity field comprises only a single bit. By including a validity field that comprises a large number of bits, for example 32, the chances of an incorrectly decrypted data packet containing the correct parity field is extremely low. This feature provides increased robustness in the data check. If all of these checks are successful then the data may be transmitted to any desired destination for use. If any of the checks fail then the data is not transmitted, and in one embodiment a system reset is performed.

As mentioned above, in some embodiments, the regions 4A, 4B, . . . , 4X of the external memory 3 have different sizes. Having regions of differing size increases the robustness of the system by preventing the system from producing a valid dataset for one region and the CPU 5 writing the data to another region, then performing the reverse operation on reading.

In order to increase the overall security of the system, the circuit 1 is a monolithic device such as a monolithic semiconductor integrated circuit. This prevents hackers from removing components and substituting them for illegitimate replacements. For example, since the fuses are part of the monolithic circuit, it will be difficult to replace blown fuses with fuses that have not been blown.

As can be seen from the description above, the present invention provides a method and apparatus for emulating on-chip memory using an external memory and one or more secure on-chip fuses. Since external memory is significantly cheaper than on-chip memory, one embodiment of the present invention provided a larger memory for less cost. Also, since the external memory is off-chip, chip space is conserved. To protect the external memory from hackers, a number of fuses are provided on-chip. However, the area of the chip occupied by the fuses is significantly smaller than the area that would have been occupied if the memory was provided on-chip.

In one embodiment of the invention the external memory 3 is used to store device keys including box pairing keys for use in cryptographic systems such as HDCP (High-bandwidth Digital Content Protection), AACS (Advanced Access Content System) and VCPS (Video Content Protection System). It is important for maintaining security that such keys remain secret. It would be desirable to store the keys in on-chip memory which is secure. However this type of key is usually relatively large (for example at least 256 bytes each) and providing sufficient sized on-chip memory would be expensive in both cost and chip area. The present invention would allow the keys to be stored in the external memory 3 in encrypted form with comparable security to storing the keys on-chip but with considerably reduced cost.

In some embodiments, the CPU 5 may be vulnerable to hacking and may be insecure. Therefore it is not desirable that encryption or decryption keys read from the external memory 3 are transmitted to the CPU 5 after they have been decrypted. Accordingly, in one embodiment, after a key has been read from the external memory 3 and decrypted by the cryptographic circuit 9, instead of being transmitted back to the CPU 5 via data pathway 15, the key is transmitted via a separate data pathway (not shown) to a secure cryptographic device (not shown) which may then use the key. Since a key received from the external memory 3 by the CPU 5 via data pathway 13 would be in an encrypted form, even if the CPU 5 is infiltrated the security of the system would be maintained since a hacker would not be able to decrypt the key received by the CPU 5.

A hardware state machine 50 may be provided to completely manage data read operations from the external memory 3 to further increase security. The keys may be stored initially in the external memory 3 in the manner described above under the control of the manufacturer of the set-top-box containing the circuit 1. Under these circumstances, the CPU 5 may have access to unencrypted keys. However, since the storage of the keys is performed under the control of the manufacturer, for example at the manufacturing stage of the set-top-box or before the set-top-box is distributed, at this point the CPU 5 may be considered secure.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit for restricting data access to and from an external memory that includes one or more regions and stores data in an encrypted form, the circuit comprising:

a first cryptographic circuit for encrypting data transmitted from the circuit to the external memory and for decrypting data transmitted from the external memory to the circuit, the encrypting and decrypting being performed using a secret encryption or decryption key; and one or more fuses, each fuse corresponding to one of the regions of the external memory, and which are initially in a first state and which may be irreversibly changed to a second state;

in which the circuit is arranged to cause a change in state of a selected fuse from the first state to the second state, the selected fuse corresponding to a region of the external memory to which data has been written and in which the circuit is further arranged to block data writes to the external memory if data is being written to a region for which the corresponding fuse is in the second state.

2. The semiconductor integrated circuit of claim 1 further arranged to block data reads from the external memory if data is being read from a region for which the corresponding fuse is in the first state.

3. The semiconductor integrated circuit of claim 1 in which the first cryptographic circuit is arranged to perform a check of the state of one or more of the fuses.

4. The semiconductor integrated circuit of claim 1 in which the first cryptographic circuit is arranged to cause the change in state of the selected fuse.

5. The semiconductor integrated circuit of claim 1, further comprising a controller arranged to cause the change in state of the selected fuse.

6. The semiconductor integrated circuit of claim 1 in which the encryption or decryption key used to encrypt or decrypt data is unique to the circuit.

7. The semiconductor integrated circuit of claim 1, further comprising a second cryptographic circuit arranged to encrypt a fixed value using a second key, and further arranged to transmit the encrypted value to the first cryptographic circuit where the first cryptographic circuit uses the encrypted value as a key for encrypting or decrypting data.

8. The semiconductor integrated circuit of claim 1 in which the regions of the external memory are not all the same size.

9. The semiconductor integrated circuit of claim 1 in which the external memory is a non-volatile flash memory.

10. The semiconductor integrated circuit of claim 1 in which the data is comprised in data packets.

11. The semiconductor integrated circuit of claim 1 in which the external memory is arranged to store encryption and decryption keys for one or more cryptographic systems.

12. The semiconductor integrated circuit of claim 1 in which data read operations are managed by a hardware state machine.

13. The semiconductor integrated circuit of claim 1 in which data retrieved from the external memory is transmitted to one or more secure cryptographic devices after the data is decrypted.

14. The semiconductor integrated circuit of claim 1 in which the circuit is a monolithic device.

15. The semiconductor integrated circuit of claim 1 wherein the one or more fuses comprise a plurality of fuses each corresponding to one of a plurality of regions of the external memory.

16. The semiconductor integrated circuit of claim 8 in which no two regions of the external memory are the same size.

17. The semiconductor integrated circuit of claim 10 in which each data packet comprises an identification of the region to which the data packet is to be written to.

18. The semiconductor integrated circuit of claim 10 in which each data packet comprises a parity field.

19. The semiconductor integrated circuit of claim 10 in which each data packet comprises a validity field.

20. The semiconductor integrated circuit of claim 17 in which the circuit is further arranged to perform a region identification check by comparing the region identification comprised in a data packet retrieved from the external memory with an identification of the region from which the data packet was retrieved.

21. The semiconductor integrated circuit of claim 18 in which the circuit is further arranged to perform a parity check of data comprised in a data packet retrieved from the external memory using the parity field.

22. The semiconductor integrated circuit of claim 19 in which the validity field is at least 32 bits in size.

23. The semiconductor integrated circuit of claim 19 in which the circuit is arranged to perform a validity check of data comprised in a data packet retrieved from the external memory using the validity field.

24. The semiconductor integrated circuit of claim 20 in which the circuit is arranged to perform a system reset if the region identification check fails.

25. The semiconductor integrated circuit of claim 21 in which the circuit is arranged to perform a system reset if the parity check fails.

26. The semiconductor integrated circuit of claim 23 in which the circuit is arranged to perform a system reset if the validity check fails.

27. A set-top-box, comprising:
an external memory that includes one or more regions and stores data in an encrypted form; and
a semiconductor integrated circuit for restricting data access to and from the external memory, the circuit including:
a first cryptographic circuit for encrypting data transmitted from the circuit to the external memory and for decrypting data transmitted from the external memory to the circuit, the encrypting and decrypting being performed using a secret encryption or decryption key; and
one or more fuses, each fuse corresponding to one of the regions of the external memory, and which are initially in a first state and which may be irreversibly changed to a second state;
in which the circuit is arranged to cause a change in state of a selected fuse from the first state to the second state, the selected fuse corresponding to a region of the external memory to which data has been written and in which the circuit is further arranged to block data writes to the external memory if data is being written to a region for which the corresponding fuse is in the second state.

28. The set-top-box of claim 27 in which the first cryptographic circuit is arranged to perform a check of the state of one or more of the fuses.

29. The set-top-box of claim 27 in which the first cryptographic circuit is arranged to cause the change in state of the selected fuse.

30. The set-top-box of claim 27, further comprising a controller arranged to cause the change in state of the selected fuse.

31. The set-top-box of claim 27 wherein the one or more fuses comprise a plurality of fuses each corresponding to one of a plurality of regions of the external memory.

32. A method for restricting data access to and from an external memory which comprise one or more regions and which stores data in an encrypted form, the method comprising the steps of:
encrypting a data packet using a unique key;
selecting a first region of the external memory to which the encrypted data packet is to be written;
determining whether the selected first region has already been written to by determining a state of a fuse corresponding to the selected first region;

writing the encrypted data packet to the selected first region if the fuse corresponding to the selected region is in a first state indicating that the selected first region has not already been written to;

irreversibly changing the state of the fuse corresponding to the selected first region from the first state to a second state when the encrypted data packet has been written to the selected first region; and blocking the writing of the encrypted data packet if the fuse corresponding to the selected first region is in the second state indicating that the selected first region has already been written to.

33. The method of claim 32 comprising the further step of forming a data packet comprising an identification of the region to which the data packet is to be written to.

34. The method of claim 32 comprising the further step of forming a data packet comprising a parity field.

35. The method of claim 32 further comprising the step of forming a data packet comprising a validity field.

36. The method of claim 32 comprising the further steps of:
selecting a second region of the external memory from which a data packet is to be read;
determining whether the selected second region has been written to by determining a state of a fuse corresponding to the selected second region;
blocking the data read if the fuse corresponding to the selected second region is in the first state indicating that the selected second region has not been written to; and
retrieving and decrypting the data packet from the selected second region if the fuse corresponding to the selected second region is in the second state indicating that the selected second region has been written to.

37. The method of 32 wherein the steps are performed under the control of an integrated circuit comprising the fuse corresponding to the selected first region.

38. The method of claim 36 comprising the further step of performing a region identification check by comparing a region identification comprised in a data packet retrieved from the external memory with an identification of the region from which the data packet was retrieved.

39. The method of claim 36 comprising the further step of performing a parity check of data comprised in a data packet retrieved from the external memory using a parity field.

40. The method of claim 36 comprising the further step of performing a validity check of data comprised in a data packet retrieved from the external memory using a validity field.

41. The method of claim 38 comprising the further step of performing a system reset if the region identification check fails.

42. The method of claim 39 comprising the further step of performing a system reset if the parity check fails.

43. The method of claim 40 comprising the further step of performing a system reset if the validity check fails.

44. A semiconductor integrated circuit for restricting data access to and from an external memory that includes one or more regions, the circuit comprising:
one or more fuses, each fuse corresponding to a respective one of the regions of the external memory, and which are initially in a first state and which may be irreversibly changed to a second state; and
means for blocking writing to the one of the one or more regions in response to determining that the fuse corresponding to the one of the one or more regions is in the second state.

45. The integrated circuit of claim 44, further comprising means for decrypting data read from the external memory.

46. The integrated circuit of claim 44, further comprising means for blocking reading of one of the one or more regions in response to determining that the fuse corresponding to the one of the one or more regions is in the first state.

47. The integrated circuit of claim 44 wherein the one or more fuses comprises a plurality of fuses.

48. The integrated circuit of claim 45 wherein the data is read from a selected one of the one or more regions and the means for encrypting data includes means for checking the state of the fuse corresponding to the selected region and blocking the decrypting of the data if the fuse corresponding to the selected region is in the first state.

* * * * *